US012793423B2

(12) United States Patent
Tokumi et al.

(10) Patent No.: US 12,793,423 B2
(45) Date of Patent: Nov. 10, 2026

(54) INTRUSION DETERMINATION DEVICE, INTRUSION DETERMINATION METHOD, AND COMPUTER READABLE MEDIUM

(71) Applicant: NEC Corporation, Tokyo (JP)

(72) Inventors: Eiichi Tokumi, Tokyo (JP); Shohei Ikeda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 298 days.

(21) Appl. No.: 18/274,652

(22) PCT Filed: Jan. 25, 2022

(86) PCT No.: PCT/JP2022/002526

§ 371 (c)(1),
(2) Date: Jul. 27, 2023

(87) PCT Pub. No.: WO2023/286295

PCT Pub. Date: Jan. 19, 2023

(65) Prior Publication Data

US 2024/0096099 A1 Mar. 21, 2024

(30) Foreign Application Priority Data

Jul. 14, 2021 (JP) ................................ 2021-116109

(51) Int. Cl.
*G06V 20/52* (2022.01)
*G01S 13/86* (2006.01)
(Continued)

(52) U.S. Cl.
CPC ............ *G06V 20/52* (2022.01); *G01S 13/865* (2013.01); *G01S 13/867* (2013.01); *G01S 13/91* (2013.01); *G01S 17/88* (2013.01)

(58) Field of Classification Search
CPC ..... G06V 20/52; G01S 13/865; G01S 13/867; G01S 13/91; G01S 17/88
See application file for complete search history.

(56) References Cited

U.S. PATENT DOCUMENTS

| | | | | |
|---|---|---|---|---|
| 2018/0222582 | A1 | 8/2018 | Ohata et al. | |
| 2020/0045416 | A1 | 2/2020 | Kamio et al. | |
| 2020/0162489 | A1 * | 5/2020 | Bar-Nahum ............. | G08G 5/55 |

FOREIGN PATENT DOCUMENTS

| | | | |
|---|---|---|---|
| CN | 112068111 | A | 12/2020 |
| JP | H07-098218 | A | 4/1995 |

(Continued)

OTHER PUBLICATIONS

International Search Report for PCT Application No. PCT/JP2022/002526, mailed on Mar. 1, 2022.

(Continued)

*Primary Examiner* — David F Dunphy
(74) *Attorney, Agent, or Firm* — Sughrue Mion, PLLC

(57) ABSTRACT

A detection device is constructed by a combination of a plurality of types of detection sensors, which include at least a photographing device serving as a sensor that detects an unmanned aerial vehicle, among a plurality of types of detection sensors including a radar, a lidar, a passive radar, and the photographing device. An acquisition unit acquires a sensor signal output. An image processing unit detects an unmanned aerial vehicle by object recognition processing from an image photographed. A determination unit determines whether or not a suspicious vehicle, which is an unmanned aerial vehicle not permitted to fly in the monitored airspace, has intruded into the monitored airspace on the basis of the result of detecting an unmanned aerial vehicle from the photographed image and a sensor signal output from a detection sensor other than the photographing device among the plurality of types of detection sensors constructing the detection device.

13 Claims, 9 Drawing Sheets

(51) Int. Cl.
*G01S 13/91* (2006.01)
*G01S 17/88* (2006.01)

(56) References Cited

FOREIGN PATENT DOCUMENTS

| | | | | | |
|---|---|---|---|---|---|
| JP | 2004-116998 | A | | 4/2004 | |
| JP | 2011211114 | A | * | 4/2013 | ............... G08G 5/00 |
| JP | 2017-173298 | A | | 9/2017 | |
| JP | 2019-211249 | A | | 12/2019 | |
| WO | 2017/017984 | A1 | | 2/2017 | |

OTHER PUBLICATIONS

English translation of Written opinion for PCT Application No. PCT/JP2022/002526, mailed on Mar. 1, 2022.

* cited by examiner

Fig.3

| TYPE | FEATURE | DETECTION DISTANCE | WEATHERABILITY |
|---|---|---|---|
| PASSIVE RADAR (RADIO WAVE DETECTION SENSOR) | POSITION OF UNMANNED AERIAL VEHICLE IS SPECIFIED BY DETECTING RADIO WAVE FOR COMMUNICATION. | ABOUT 1 Km | HARDLY AFFECTED BY WEATHER |
| CAMERA | IMAGE OF MONITORED AIRSPACE IS CAPTURED. UNMANNED AERIAL VEHICLE CAN BE DETECTED THROUGH OBJECT RECOGNITION PROCESSING WITH RESPECT TO CAPTURED IMAGE. | SEVERAL HUNDREDS m | AFFECTED BY WEATHER |
| RADAR | UNMANNED AERIAL VEHICLE IS DETECTED BY EMITTING AND RECEIVING RADIO WAVE. | SEVERAL Km | HARDLY AFFECTED BY WEATHER |
| LIDAR | UNMANNED AERIAL VEHICLE IS DETECTED BY IRRADIATING AND RECEIVING LASER. | SEVERAL HUNDREDS m | AFFECTED BY RAIN |

INTRUSION DETERMINATION DEVICE, INTRUSION DETERMINATION METHOD, AND COMPUTER READABLE MEDIUM

This application is a National Stage Entry of PCT/JP2022/002526 filed on Jan. 25, 2022, which claims priority from Japanese Patent Application 2021-116109 filed on Jul. 14, 2021, the contents of all of which are incorporated herein by reference, in their entirety.

TECHNICAL FIELD

The present invention relates to a technique for detecting a suspicious unmanned aerial vehicle that is not permitted to fly.

BACKGROUND ART

In logistics, infrastructure inspection, and the like, the use of unmanned aerial vehicles has begun in earnest. Here, the unmanned aerial vehicle is an airplane, a rotorcraft, a glider, an airship, or the like that can be used for flight, and is one that can be flown by remote control or automatic control among airplanes, rotorcrafts, gliders, airships, and the like that are not structurally allowed for a person to ride. Such an unmanned aerial vehicle is also referred to as a drone, an unmanned aerial vehicle (UAV), or the like.

Concerning the flight of the unmanned aerial vehicle, in an airspace that may affect the safety of the flight of the aerial vehicle or in an airspace that is highly likely to harm a person on the ground or the like if the unmanned aerial vehicle falls, the unmanned aerial vehicle is required to obtain permission in advance to fly in such an airspace in order to secure safety. However, as the use of unmanned aerial vehicles increases, there is a concern that non-permitted unmanned aerial vehicles (hereinafter also referred to as suspicious machines) increasingly fly in an airspace requiring permission for flight.

Therefore, it may be considered to detect a suspicious machine that is about to intrude into an airspace requiring permission for flight (hereinafter also referred to as a specific airspace) or a suspicious machine that has intruded into a specific airspace, and cope with the detected suspicious machine.

PTL 1 (JP 2019-211249 A) discloses a technique for detecting whether there is a flying object in a detection area and a position of the flying object using a sound detection sensor and a radar. PTL 2 (JP 2017-173298 A) discloses a technique for detecting an object in a traveling direction of a vehicle using a LiDAR and a sensing device mounted on the vehicle. PTL 3 (JP 2004-116998 A) discloses a technique for detecting the type of moving object (for example, whether the moving object is a combat aircraft or a large aircraft) using a radar device and an image capturing device.

CITATION LIST

Patent Literature

PTL 1: JP 2019-211249 A
PTL 2: JP 2017-173298 A
PTL 3: JP 2004-116998 A

SUMMARY OF INVENTION

Technical Problem

From the viewpoint of accident prevention, there is a demand for reliably preventing an intrusion of a suspicious machine into the specific airspace as described above. As one object to meet this demand, there is an object related to detection of an unmanned aerial vehicle. This object is to reduce an occurrence of a detection failure or an erroneous detection of a suspicious machine approaching the specific airspace, thereby increasing performance (that is, accuracy of detection) in detecting a suspicious machine approaching the specific airspace. For example, it may be considered to use a radar as a sensor for detecting an unmanned aerial vehicle. However, an unmanned aerial vehicle called a drone or the like is smaller than a manned aerial vehicle such as a helicopter, and may continue flying at an altitude lower than the heights of buildings. When such a small unmanned aerial vehicle is detected, it is considered that an aircraft radar such as an airport surveillance radar (ASR) has a poor resolution and is likely to cause an erroneous detection of an unmanned aerial vehicle. That is, there is a possibility that a detection failure of a suspicious machine occurs. In addition, in a place where there are many shadowing objects such as buildings, the radar is adversely affected by multipath because radio waves emitted from the radar are reflected by the shadowing objects, resulting in an erroneous detection, which causes a problem of a decrease in reliability in detecting a suspicious machine. Such an occurrence of a detection failure or an erroneous detection of a suspicious machine may cause a situation in which the intrusion of the suspicious machine into the specific airspace cannot be prevented.

The present invention has been made in order to solve the aforementioned problem. That is, a main object of the present invention is to provide a technique for reducing an occurrence of a detection failure or an erroneous detection of a suspicious machine in a monitored airspace.

Solution to Problem

According to an aspect of the present invention for achieving the above-described object, an intrusion determination device includes:

- an acquisition unit that acquires sensor signals output from a detection device constituted by a combination of a plurality of types of detection sensors including at least an image capturing device serving as a sensor that detects an unmanned aerial vehicle in a monitored airspace, among a plurality of types of detection sensors including a radar that detects an unmanned aerial vehicle in the monitored airspace using a radio wave, a LiDAR that detects an unmanned aerial vehicle in the monitored airspace using a laser beam, a passive radar that detects an unmanned aerial vehicle in the monitored airspace by detecting a radio wave used by the unmanned aerial vehicle for communication, and the image capturing device;
- an image processing unit that detects an unmanned aerial vehicle through object recognition processing from a captured image as a sensor signal output from the image capturing device; and
- a determination unit that determines whether a suspicious machine, which is an unmanned aerial vehicle not permitted to fly in the monitored airspace, has intruded into the monitored airspace, based on a sensor signal output from a detection sensor other than the image capturing device among the plurality of types of detection sensors constituting the detection device and a result of detecting an unmanned aerial vehicle in the captured image.

According to another aspect of the present invention, an intrusion detection system includes:

a detection device constituted by a combination of a plurality of types of detection sensors including at least an image capturing device serving as a sensor that detects an unmanned aerial vehicle in a monitored airspace, among a plurality of types of detection sensors including a radar that detects an unmanned aerial vehicle in the monitored airspace using a radio wave, a LiDAR that detects an unmanned aerial vehicle in the monitored airspace using a laser beam, a passive radar that detects an unmanned aerial vehicle in the monitored airspace by detecting a radio wave used by the unmanned aerial vehicle for communication, and the image capturing device; and the above-described intrusion determination device.

According to another aspect of the present invention, an intrusion determination method performed by a computer includes:

acquiring sensor signals output from a detection device constituted by a combination of a plurality of types of detection sensors including at least an image capturing device serving as a sensor that detects an unmanned aerial vehicle in a monitored airspace, among a plurality of types of detection sensors including a radar that detects an unmanned aerial vehicle in the monitored airspace using a radio wave, a LiDAR that detects an unmanned aerial vehicle in the monitored airspace using a laser beam, a passive radar that detects an unmanned aerial vehicle in the monitored airspace by detecting a radio wave used by the unmanned aerial vehicle for communication, and the image capturing device;

detecting an unmanned aerial vehicle through object recognition processing from a captured image as a sensor signal output from the image capturing device; and determining whether a suspicious machine, which is an unmanned aerial vehicle not permitted to fly in the monitored airspace, has intruded into the monitored airspace, based on a sensor signal output from a detection sensor other than the image capturing device among the plurality of types of detection sensors constituting the detection device and a result of detecting an unmanned aerial vehicle in the captured image.

According to another aspect of the present invention, a program storage medium stores a computer program causing a computer to execute:

acquiring sensor signals output from a detection device constituted by a combination of a plurality of types of detection sensors including at least an image capturing device serving as a sensor that detects an unmanned aerial vehicle in a monitored airspace, among a plurality of types of detection sensors including a radar that detects an unmanned aerial vehicle in the monitored airspace using a radio wave, a LiDAR that detects an unmanned aerial vehicle in the monitored airspace using a laser beam, a passive radar that detects an unmanned aerial vehicle in the monitored airspace by detecting a radio wave used by the unmanned aerial vehicle for communication, and the image capturing device;

detecting an unmanned aerial vehicle through object recognition processing from a captured image as a sensor signal output from the image capturing device; and determining whether a suspicious machine, which is an unmanned aerial vehicle not permitted to fly in the monitored airspace, has intruded into the monitored airspace, based on a sensor signal output from a detection sensor other than the image capturing device among the plurality of types of detection sensors constituting the detection device and a result of detecting an unmanned aerial vehicle in the captured image.

Advantageous Effects of Invention

According to the present invention, it is possible to reduce an occurrence of a detection failure or an erroneous detection of a suspicious machine in a monitored airspace.

BRIEF DESCRIPTION OF DRAWINGS

FIG. 3 is a diagram for explaining specific examples of detection sensors that can be employed in a detection device.

EXAMPLE EMBODIMENT

Hereinafter, example embodiments according to the present invention will be described with reference to the drawings.

First Example Embodiment

Figure 1:
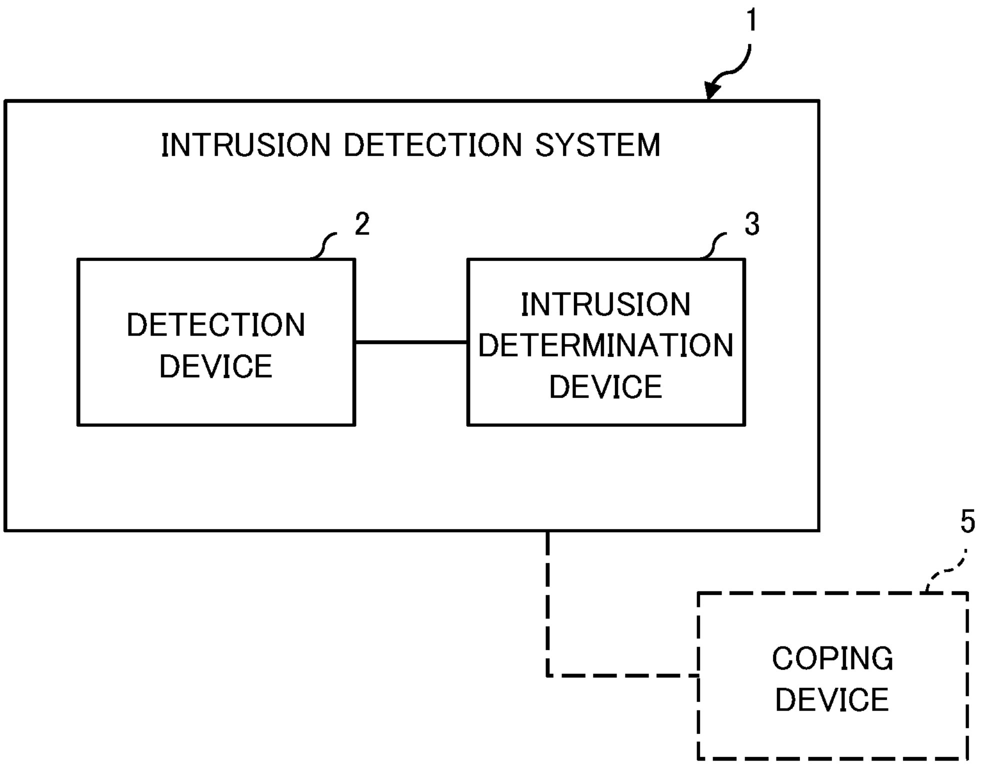
FIG. 1 is a block diagram illustrating a configuration of an intrusion detection system according to a first example embodiment of the present invention.

FIG. 1 is a block diagram illustrating a simplified configuration of an intrusion detection system according to a first example embodiment of the present invention. The intrusion detection system 1 is a system that detects an intrusion of a suspicious machine into a monitored airspace. Here, the suspicious machine is an unmanned aerial vehicle that is not permitted in an airspace where permission for flight is required (hereinafter also referred to as a specific airspace). Here, it is assumed that the unmanned aerial vehicle is an airplane, a rotorcraft, a glider, an airship, or the like that can be used for flight, and is one that can be flown by remote control or automatic control among airplanes, rotorcrafts, gliders, airships, and the like that are not structurally allowed for a person to ride. The unmanned aerial vehicle includes a so-called drone or flying vehicle.

Here, the monitored airspace is an airspace including a specific airspace and an airspace around the specific airspace (hereinafter, this airspace around the specific airspace is also referred to as a security airspace), and is an airspace defined to be monitored. The specific airspace is an airspace that requires permission for flight. The security airspace is, for example, an airspace set in advance assuming that a suspicious machine is coped with in order to prevent an intrusion into the specific airspace, and has an appropriate size in consideration of a moving speed of the assumed suspicious machine or the like. Specific examples of the monitored airspace include airspaces above and around important facilities such as airports, power plants, commercial facilities, stadiums, petrochemical complexes, and governmental facilities. In addition, specific examples of the monitored airspace also include routes for unmanned aerial vehicles that are permitted to fly, such as logistics-related routes, routes (corridors) for aircrafts other than the unmanned aerial vehicles, and airspaces around the route.

As a method for coping with a suspicious machine, the control for the flight of the suspicious machine may be hindered by interfering with communication of an operation radio wave between the suspicious machine and an operation device. This coping method is also referred to as radio wave jamming or jamming.

In addition, as another countermeasure for coping with a suspicious machine, the suspicious machine may be captured by a mesh (net). In this method, an unmanned aerial vehicle equipped with a net (hereinafter also referred to as a capturing machine) is used, or a projection gun that projects a net is used.

As another method for coping with a suspicious machine, the flight of the suspicious machine may be hindered by laser irradiation or the like, or the suspicious machine may be forcibly landed by controlling a control device (computer) mounted on the suspicious machine by hacking.

As illustrated in FIG. 1, the intrusion detection system 1 according to the first example embodiment includes a detection device 2 and an intrusion determination device 3. The detection device 2 is a device that detects an unmanned aerial vehicle in a monitored airspace, and here, is constituted by a combination of a plurality of types of detection sensors that detect an unmanned aerial vehicle.

FIG. 3 illustrates specific examples of such detection sensors That is, one of the detection sensors is a passive radar (radio wave detection sensor). The passive radar is a sensor that detects a radio wave communicated between an unmanned aerial vehicle and an operation device that operates (steers) the unmanned aerial vehicle (i.e., a radio wave for transmitting a signal from the operation device to the unmanned aerial vehicle or a radio wave for transmitting a signal from the unmanned aerial vehicle to the operation device). Based on the sensor signal output from the passive radar, a position of the unmanned aerial vehicle can be specified. It is also possible to specify a position of the operation device (operator). By keeping a history (log) of sensor signals output from the passive radar, the history (log) of sensor signals can be used as evidence for specifying the position of the unmanned aerial vehicle or the operation device (operator). In a case where passive radars are used in the detection device 2, the number of passive radars may be one or more. For example, in a case where a monitored airspace is too wide to detect the entire monitored airspace with one passive radar, a plurality of passive radars are installed in such a way that the entire monitored airspace can be detected.

Another one of the detection sensors is a camera, which is an image capturing device. The camera captures an image of a monitored airspace and outputs the captured image as a sensor signal. The image captured by the camera is processed by object recognition processing, such that an unmanned aerial vehicle can be detected from the captured image. Examples of the camera used for detecting an unmanned aerial vehicle include a visible light camera and an infrared light camera.

In a case where a camera is used, one camera or a plurality of cameras may be used. For example, in a case where there is an obstacle such as a building that blocks the field of view of the camera in the monitored airspace, there is a blind spot for the camera in the monitored airspace. In such a case, a plurality of cameras are installed in the monitored airspace in such a way as to eliminate the blind spot. By using a plurality of cameras in this manner, the blind spot can be eliminated, and furthermore, the monitored airspace is captured by the plurality of cameras from different directions, thereby making it easy to specify a position of an unmanned aerial vehicle in the monitored airspace based on images captured by the cameras.

Furthermore, the camera as a detection sensor adopted in the detection device 2 is not limited to a fixed camera, and may be, for example, a portable camera. An aspect of the portable camera is not limited, and for example, the portable camera may be incorporated in a wearable terminal (eyeglass-type or the like), or may be incorporated in a portable terminal device such as a smartphone or a tablet terminal. The portable camera is carried by or mounted on, for example, a security guard monitoring the monitored airspace or an employee located in or around the monitored airspace, to capture the monitored airspace manually or under computer control. It is preferable that a device (a camera stand-alone device, a wearable terminal, a mobile terminal device, or the like) including a portable camera used for the detection device 2 has a communication function for transmitting captured images from moment to moment, in such a way that images captured by the portable camera can be used in real time.

Another one of the detection sensors is a radar. The radar emits a radio wave and receives a reflected wave when the radio wave is reflected by an object, making it possible to calculate whether an object is present or absent, a distance to the object, and a direction of the object, based on a time from the emission of the radio wave to the reception of the radio wave as the reflected wave and the direction in which the reflected wave is received. A sensor signal output from the radar includes information indicating the calculated distance to the object and the calculated direction. Some radars are used for social infrastructure systems such as air traffic control, weather observation, and ship operation. The radars are different in frequency of radio wave and power of radiation depending on the purposes of use.

In a case where a radar is used in the detection device 2, one radar or a plurality of radars may be used. As a type of radar, there is a radar that changes a radiation direction of a radio wave to scan a monitored airspace, and in this type of radar, in a case where the monitored airspace is wide, a time required to scan the entire monitored airspace once is long, resulting in a risk of a long delay until a suspicious machine is detected by the radar from the time when the suspicious machine intrudes into the monitored airspace. In order to shorten such a delay, it may be considered to use a plurality of radar in such a way as to narrow an area for which a radio wave is scanned with each of the radars.

In addition, in a case where the monitored airspace is, for example, an airport, it is difficult to newly provide another radar, because interference with a radio wave of an existing air traffic control radar is a problem. In such a case, the air traffic control radar may also be used as the detection device 2. In a certain monitored airspace where it is difficult to provide a new radar as described above, an existing radar such as a marine radar or a weather radar may be used in the detection device 2.

Figure 4:
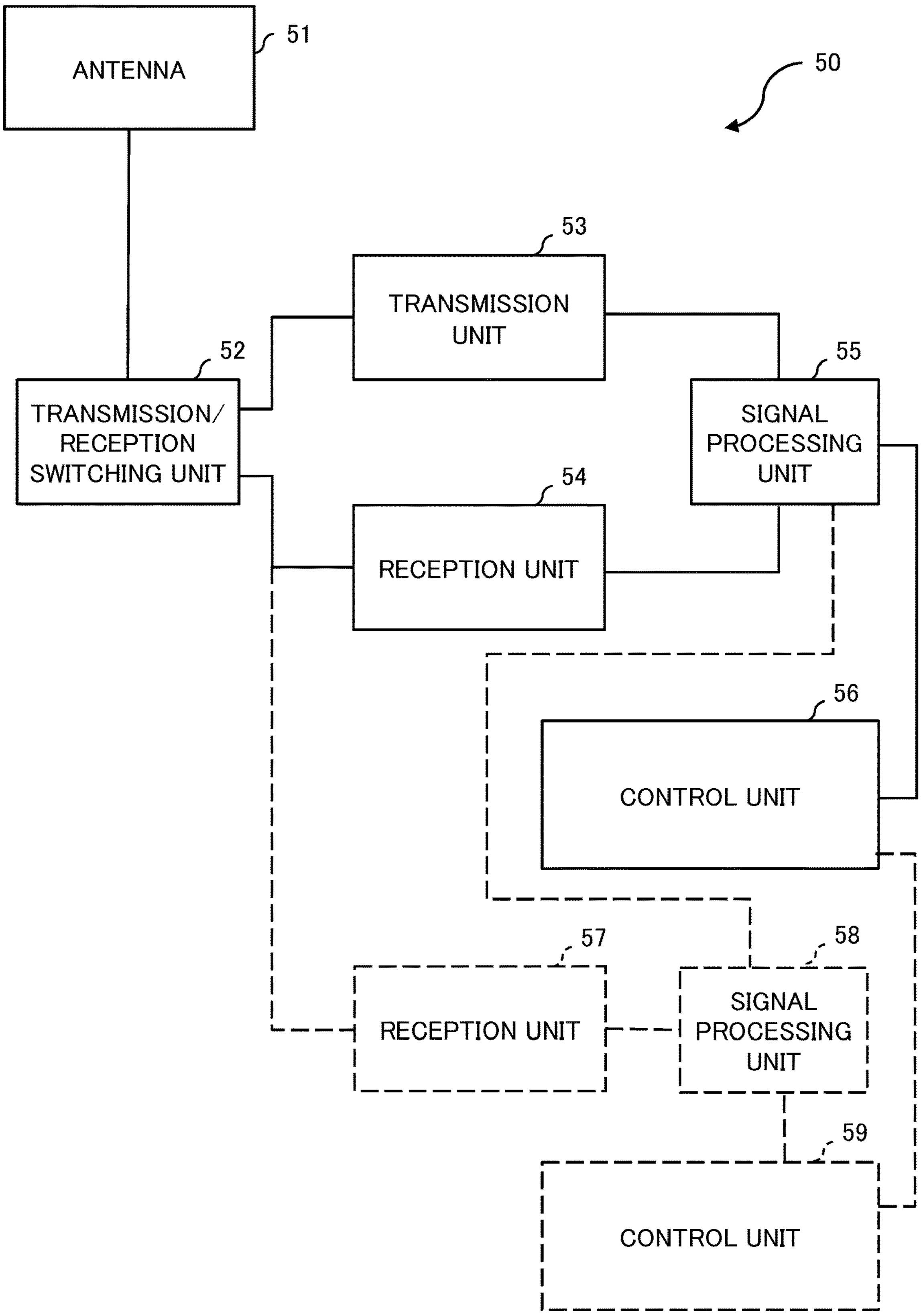
FIG. 4 is a diagram for explaining an example of a configuration of a radar device.

Incidentally, FIG. 4 is a block diagram illustrating main components of the radar device. As indicated by a solid line in FIG. 4, the radar device 50 includes an antenna 51, a transmission/reception switching unit 52, a transmission unit 53, a reception unit 54, a signal processing unit 55, and a control unit 56.

The antenna 51 has a configuration for transmitting and receiving radio waves (e.g., microwaves). The transmission/reception switching unit 52 has a configuration for connect the antenna 51 to one of the transmission unit 53 and the reception unit 54 in a switchable manner, and alternately switches between a state in which the antenna 51 is connected to the transmission unit 53 and a state in which the antenna 51 is connected to the reception unit 54 at a set cycle.

The transmission unit 53 has a circuit configuration for generating a transmission signal as a basis for a radio wave radiated from the antenna 51 based on a pulse signal supplied from the signal processing unit 55. The reception unit 54 has a circuit configuration for extracting a reflection signal for the pulse signal on the transmission side by amplifying a reception signal based on the radio wave received by the antenna 51 and detecting the amplified reception signal, and outputting the reflection signal to the signal processing unit 55.

The signal processing unit 55 outputs a pulse signal to the transmission unit 53, or has a circuit configuration for performing signal processing on a signal output from the reception unit 54 by a predetermined method and outputting a digital signal according to the signal processing to the control unit 56. The control unit 56 includes a computer device such as a personal computer (PC) or a server, and executes, for example, a control operation for displaying a detection result on a display device or the like based on the signal received from the signal processing unit 55. The sensor signal of the radar is output, for example, from the control unit 56.

In a case where an existing radar device such as an air traffic control radar, a marine radar, or a weather radar is used in the detection device 2, the radar device 50 may have a configuration including a reception-side circuit for the detection device 2 as indicated by a dotted line in FIG. 4. That is, the radar device 50 used in the detection device 2 may include a reception unit 57, a signal processing unit 58, and a control unit 59 for the detection device 2. The reception unit 57 has a circuit configuration (a reception-side circuit) similar to that of the reception unit 54, and the signal processing unit 58 has a configuration for processing a signal output from the reception unit 57. The signal processing unit 58 may not have a configuration for signal processing on the transmission side, and may acquire information related to signal processing on the transmission side from the signal processing unit 55 if necessary. The control unit 59 executes, for example, a control operation for displaying a detection result of an unmanned aerial vehicle on a display device or the like based on the signal (that is, a digital signal based on a signal received by the antenna 51) output from the signal processing unit 58. As described above, in a case where the configuration for the detection device 2 is provided in the radar device 50, a sensor signal of the radar is output from the control unit 59.

The reception unit 57 and the signal processing unit 58 for the detection device 2 may be provided in the same device as the reception unit 54 and the signal processing unit 55 for the existing radar, or may be provided in a separate device from as the reception unit 54 and the signal processing unit 55 for the existing radar. Furthermore, the control unit 59 for the detection device 2 may be constituted by the same computer device as the computer device of the control unit 56 for the existing radar, or may be constituted by another computer device from the control unit 56 for the existing radar.

As described above, by providing the configuration on the reception side for the detection device 2 to the radar device 50 as well, it is easy to cause the radar device 50 to have a function of detecting an unmanned aerial vehicle without affecting the function as the existing radar.

Furthermore, another one of the detection sensors is LiDAR. The LiDAR emits a laser beam and receives reflected beam when the laser beam is reflected by an object, making it possible to calculate whether an object is present or absent, a distance to the object, and a direction of the object, based on a time from the emission of the laser beam to the reception of the laser beam as the reflected beam and the direction in which the reflected beam is received. A sensor signal output from the LiDAR includes information indicating the calculated distance to the object and the calculated direction. When the LiDAR and the radar are compared with each other, the radar is suitable for detecting a moving object, whereas the LiDAR is also suitable for detecting a non-moving object. The LiDAR may be used in the field of meteorology, and in this case, it is used, for example, for detecting airflow such as air turbulence. Thus, the LiDAR is also capable of detecting an unmanned aerial vehicle by detecting airflow caused by the flight of the unmanned aerial vehicle, rather than detecting the unmanned aerial vehicle itself.

In a case where a LiDAR is used in the detection device 2, one LiDAR or a plurality of LiDARs may be used. Since the LiDAR changes a radiation direction of laser beam to scan a monitored airspace, in a case where the monitored airspace is wide, a time required to scan the entire monitored airspace once is long, resulting in a risk of a long delay until a suspicious machine is detected from the time when the suspicious machine intrudes into the monitored airspace. In order to shorten such a delay, it may be considered to use a plurality of LiDARs in such a way as to narrow an area for which a radio wave is scanned with each of the LiDARs.

In the first example embodiment, the detection device 2 includes a plurality of types of detection sensors including at least a camera (an image capturing device) among the plurality of types of detection sensors including a detection sensor capable of detecting an unmanned aerial vehicle in a monitored airspace as described above. That is, each of the plurality of types of detection sensors has advantages and disadvantages. Therefore, the detection device 2 is configured by combining a plurality of types of sensors to complement the disadvantages.

For example, the radar has a wider detectable range (detection distance) than the camera, but the radar detects not only an unmanned aerial vehicle but also a bird, a wave, and the like, and thus, it is difficult for the radar to distinguish the detected unmanned aerial vehicle from the other objects. In contrast, it is easy for the camera to visually distinguish an unmanned aerial vehicle from the other objects from a captured image. Thus, it may be considered to combine a radar and a camera as the detection device 2. In a case where a radar and a camera are combined, it may be considered to perform an operation such that, for example, a flying object is initially detected by the radar and the identity of the flying object is confirmed by the camera when the flying object approaches a monitored airspace.

In addition, the detectable range (detection distance) of the radar is wider than that of the camera or the LiDAR, but in a place where there are many constructions such as buildings, the constructions are shadowing objects, and a flying object cannot be detected with one radar in many areas. It may be considered to install a LiDAR in such a way as to complement such a place. However, only detection results output from both the radar and the LiDAR are not enough to prove that an unmanned aerial vehicle has intruded into a monitored airspace. In contrast, the camera can show that an unmanned aerial vehicle has intruded into a monitored airspace through a captured image, which can serve as evidence indicating that the unmanned aerial vehicle has intruded into the monitored airspace. Thus, it may be considered to combine a radar, a LiDAR, and a camera as the detection device 2.

Further, the passive radar detects an unmanned aerial vehicle that uses a radio wave for communication, but cannot detect an autonomous unmanned aerial vehicle that does not use a radio wave or communication. In contrast, the camera can detect an unmanned aerial vehicle including an autonomous unmanned aerial vehicle from a captured image. In addition, in a place where there are many constructions such as buildings, a radio wave output from an unmanned aerial vehicle is reflected by the buildings in a multipath state, resulting in an increase in the number of erroneous detections of the passive radar. In contrast, the camera is not adversely affected by such multipath. Thus, it may be considered to combine a passive radar and a camera or to combine a radar, a passive radar, and a camera as the detection device 2.

Furthermore, as well as the above-described combinations, a combination of a LiDAR and a camera or a combination of a passive radar, a LiDAR, and a camera may be considered as the detection device 2. Furthermore, a combination of at least one of a radar, a passive radar, and a LiDAR, a detection sensor other than the radar, the passive radar, and the LiDAR, and a camera, or a combination of a detection sensor other than the radar, the passive radar, and the LiDAR and a camera may also be considered as the detection device 2.

Figure 2:
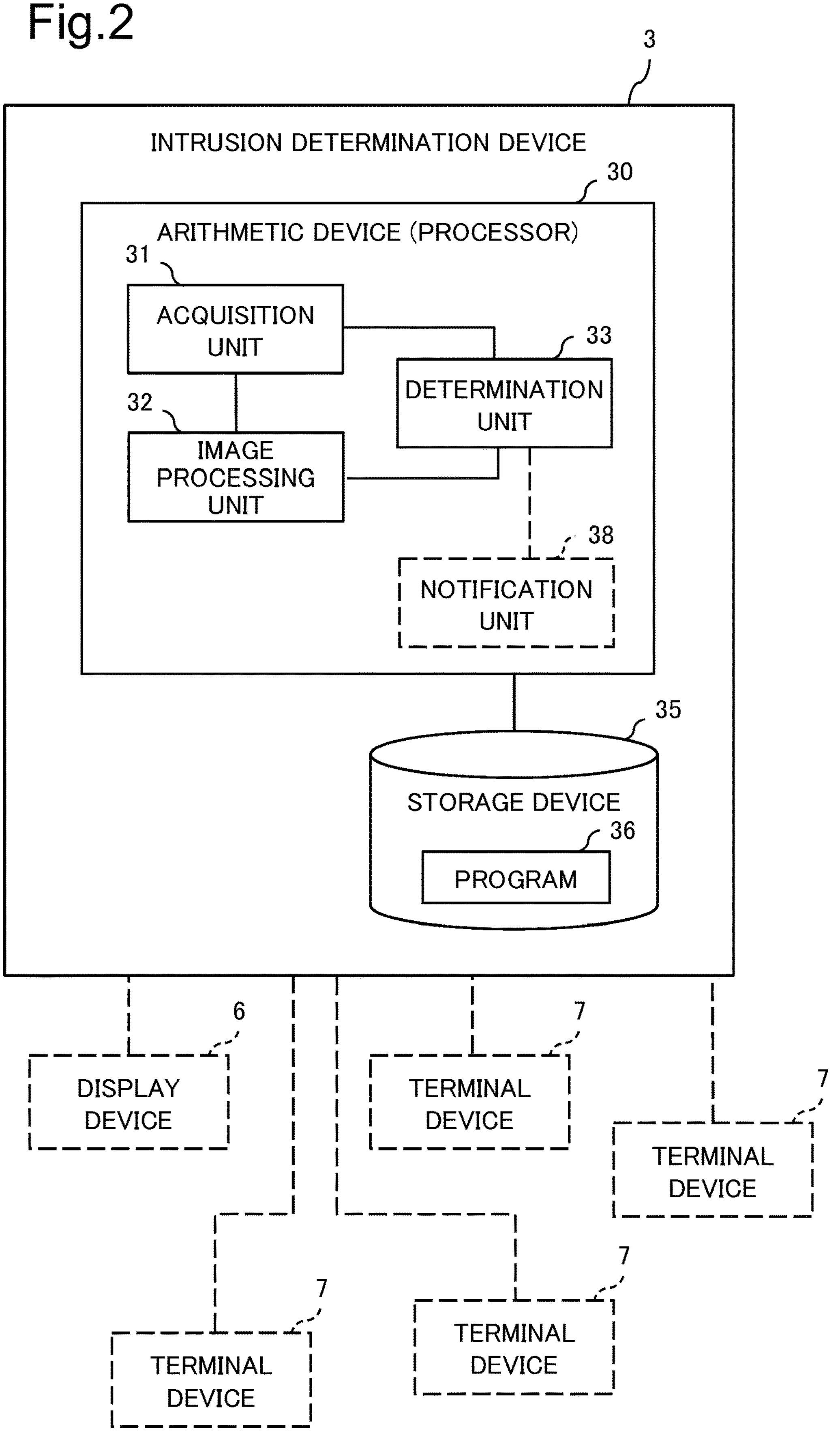
FIG. 2 is a block diagram illustrating a configuration of an intrusion determination device constituting the intrusion detection system according to the first example embodiment.

The intrusion determination device 3 is a device that determines that a suspicious machine has intruded into a monitored airspace. FIG. 2 is a block diagram illustrating an example of a configuration of the intrusion determination device 3. The intrusion determination device 3 is a computer device connected to the detection device 2, as described above, to determine whether a suspicious machine has intruded into a monitored airspace based on sensor signals output from the detection device 2. The intrusion determination device 3 includes an arithmetic device 30 and a storage device 35.

The storage device 35 includes a storage medium that stores data and a computer program (hereinafter also referred to as a program) 36. There are a plurality of types of storage devices such as a magnetic disk device and a semiconductor memory element, and there are a plurality of types of semiconductor memory elements such as a random access memory (RAM) and a read only memory (ROM). The storage device 35 included in the intrusion determination device 3 is not limited to one type. In many cases, the computer device includes a plurality of types of storage devices. Here, the types and the number of storage devices 35 included in the intrusion determination device 3 are not limited, and description thereof will be omitted. In addition, in a case where the intrusion determination device 3 includes a plurality of types of storage devices 35, the plurality of types of storage devices 35 will be collectively referred to as a storage device 35.

The arithmetic device 30 includes a processor such as a central processing unit (CPU) or a graphics processing unit (GPU). The arithmetic device 30 can have various functions based on the program 36 by reading and executing the program 36 stored in the storage device 35. Here, the arithmetic device 30 includes an acquisition unit 31, an image processing unit 32, and a determination unit 33 as functional units.

The acquisition unit 31 acquires a sensor signal output from each of the plurality of types of detection sensors constituting the detection device 2.

The image processing unit 32 performs object recognition processing on a captured image as a sensor signal output from the camera (the image capturing device) constituting the detection device 2, and detects an unmanned aerial vehicle from the captured image when the unmanned aerial vehicle is shown in the captured image. As the object recognition processing through which the unmanned aerial vehicle is detected from the captured image, for example, an artificial intelligence (AI) technology is used. In this case, a detection model is stored in advance in the storage device 35 of the intrusion determination device 3. The detection model is a model generated by machine learning of images of a wide variety of unmanned aerial vehicles to output information regarding whether there is an unmanned aerial vehicle in a captured image with a captured image being input to the detection model.

In the first example embodiment, an image (moving image) of a monitored airspace captured by the camera constituting the detection device 2 is transmitted from the detection device 2 to the intrusion determination device 3, for example, at a preset frame rate. The image processing unit 32 executes the object recognition processing as described above for each frame or each preset number of frames of the captured image acquired via the acquisition unit 31 to detect whether there is an unmanned aerial vehicle in a monitored airspace from the captured image. The image processing unit 32 outputs information indicating the detection result to the determination unit 33.

The determination unit 33 determines whether a suspicious machine has intruded into the monitored airspace based on the information indicating the result of detecting the captured image output from the image processing unit 32 and the sensor signal output from the detection sensor other than the camera constituting the detection device 2. The determination unit 33 determines whether a suspicious machine has intruded into the monitored airspace using the following data for determining whether there is an unmanned aerial vehicle.

For example, in a case where the detection device 2 is constituted by a combination of a radar and a camera, it is assumed that an object is detected in a monitored airspace based on a sensor signal output from the radar. On the other hand, it is assumed that no unmanned aerial vehicle is detected in the airspace where the object is detected, based on an image of the airspace captured by the camera. In such a case, it can be determined (confirmed) that an object detected by the radar is an object other than an unmanned aerial vehicle. In this way, by combining information based on the sensor signals output from the plurality of types of detection sensors constituting the detection device 2, it is possible to increase the reliability of the result of determination as to whether there is an unmanned aerial vehicle in the monitored airspace. The data for determining whether there is an unmanned aerial vehicle, which is used by the determination unit 33, is data for confirming whether there is an unmanned aerial vehicle from the combination of information based on the sensor signals output from the plurality of types of detection sensors constituting the detection device 2. The data is generated based on the types of the plurality of detection sensors constituting the detection device 2, what are detected by the detection sensors, and various combinations of what are detected. As a specific example of the data for determining whether there is an unmanned aerial vehicle, for example, there is data in which a combination of what are detected by the detection sensors, such as detection by the radar as to whether an object is present or absent in a monitored airspace: present and detection as to whether an unmanned aerial vehicle is present or absent in an image captured by the camera: absent, is associated with information confirming determination that there is no unmanned aerial vehicle in the monitored airspace in such a case. The data for determining whether there is an unmanned aerial vehicle is data generated assuming various situations, and is not limited to the above-described specific example.

Further, when an unmanned aerial vehicle is detected in the monitored airspace, the determination unit 33 determines whether the unmanned aerial vehicle is a suspicious machine. For example, the intrusion determination device 3 connects to an information source such as a database in which information (hereinafter also referred to as permission information) on unmanned aerial vehicles (hereinafter also referred to as permitted machines) permitted to fly in the monitored airspace is registered, and acquires the permission information from the information source. As a specific example of the permission information, there is information on a flight plan in the monitored airspace. In addition, the intrusion determination device 3 may be connected to a system that controls (operates) the permitted machines to acquire flight status (operation status) of the permitted machines in the monitored airspace. When determining that the unmanned aerial vehicle detected in the monitored airspace is not a permitted machine using the information acquired as described above, the determination unit 33 determines that the detected unmanned aerial vehicle is a suspicious machine. That is, the determination unit 33 determines that the suspicious machine has intruded into the monitored airspace. Here, a specific example will be described. For example, it is assumed that a flying object is detected by the radar and the LiDAR, a radio wave is detected by the passive radar, and there is no application in a flight plan for an unmanned aerial vehicle to fly at a position where the detected flying object is flying. Furthermore, it is assumed that in an image captured by the camera, a flying object other than a bird is captured in an area assumed to be the position at which the flying object detected by the radar and the LiDAR is flying. In this case, although there is no application for an unmanned aerial vehicle based on the flight plan, since the flying object is detected by the radar and the LiDAR, the object that emits a radio wave is detected by the passive radar, and the flying object other than a bird is captured in the image captured by the camera, it is determined that there is a high probability that the flying object is an unmanned aerial vehicle. Further, by analyzing data on sensor signals output from the detection sensors such as the radar, the LiDAR, the passive radar, and the camera constituting the detection device 2 in time series, it may be determined whether the detected unmanned aerial vehicle is a suspicious machine. For example, it is assumed that it is detected by the radar and the LiDAR that a period during which the flying object is detected in the monitored airspace and a period during which the flying object is not detected in the monitored airspace are repeated in a preset monitoring period (e.g., 20 minutes). It is also assumed that it is detected that a period during which a radio wave emitted from the monitored airspace is detected by the passive radar and a period during which no radio wave emitted from the monitored airspace is detected by the passive radar are repeated in a preset monitoring period (e.g., 20 minutes). Furthermore, it is assumed that there is no application in a flight plan for an unmanned aerial vehicle to fly at a position where the detected flying object is flying. Furthermore, it is assumed that in an image captured by the camera, a flying object other than a bird is captured in an area assumed to be the position at which the flying object detected by the radar and the LiDAR is flying. In this case, it is determined that there is a high probability that the flying object is an unmanned aerial vehicle, and it is determined that there is a high probability that the unmanned aerial vehicle is a suspicious machine because the movement of the unmanned aerial vehicle is suspicious. When the determination result is output, for example, a probability of the flying object being an unmanned aerial vehicle or a probability of the unmanned aerial vehicle being a suspicious machine may be output as a numerical value.

The intrusion determination device 3 may be connected to a display device 6 or a terminal device 7 indicated by a dotted line in FIG. 2. The terminal device 7 is, for example, a personal computer (PC), a tablet terminal, a smartphone, a wearable terminal, or the like. The terminal device 7 is possessed by, for example, each concerned person who uses the intrusion detection system 1. In such a case, the intrusion determination device 3 includes, for example, a notification unit 38 indicated by a dotted line in FIG. 2 as a functional unit of the arithmetic device 30. The notification unit 38 outputs information on the determination result of the determination unit 33 to the display device 6 and the terminal device 7, and causes the display device 6 and the display unit of the terminal device 7 to display the determination result. The information on the determination result of the determination unit 33 is, for example, information indicating that a suspicious machine has intruded into the monitored airspace. In addition, the determination unit 33 can acquire a position at which the unmanned aerial vehicle is flying in the monitored airspace based on a sensor signals of the radar, the passive radar, the LiDAR, or the like output from the detection device 2. Therefore, the notification unit 38 may output information on the position at which the unmanned aerial vehicle (in particular, the suspicious machine) is flying in such a monitored airspace to the display device 6 or the terminal device 7, and cause the display device 6 or the display unit of the terminal device 7 to display the information.

The intrusion detection system 1 may be connected to a coping device 5 indicated by a dotted line in FIG. 1. The coping device 5 is a device against a suspicious machine. When the determination unit 33 determines that a suspicious machine has intruded into a monitored airspace, the intrusion detection system 1 transmits information for notifying the intrusion of the suspicious machine to the coping device 5. At this time, the intrusion detection system 1 also transmits information on a position at which the suspicious machine is flying in such a monitored airspace to the coping device 5.

The coping device 5 starts a coping operation by receiving the information. For example, as described above, there is a method referred to as radio wave jamming or jamming as one method for coping with a suspicious machine. In this copying method, the control for the flight of the suspicious machine is hindered by interfering with an operation radio wave between the suspicious machine and an operation device (not illustrated) that operates the suspicious machine. In a case where the coping device 5 copes with a suspicious machine based on this coping method (jamming), the coping device 5 generates an interfering radio wave that interferes with the operation radio wave and emits the interfering radio wave toward the suspicious machine.

In addition, as another method for coping with a suspicious machine, the suspicious machine may be captured by a mesh (net). In this coping method, for example, a capturing machine that is an unmanned aerial vehicle may be used, or a projection gun that throws a net toward a suspicious machine may be used. In a case where a capturing machine is used, the coping device 5 has a configuration for operating the capturing machine using wireless communication in such a way that the suspicious machine is captured by the net. In a case where a projection gun is used, the coping device 5 has a configuration for controlling, for example, a direction of the projection gun and a timing for projecting the net in such a way that the suspicious machine is captured by the net. The coping device 5 is not limited to the above-described configuration, and can adopt various configurations.

Figure 5:
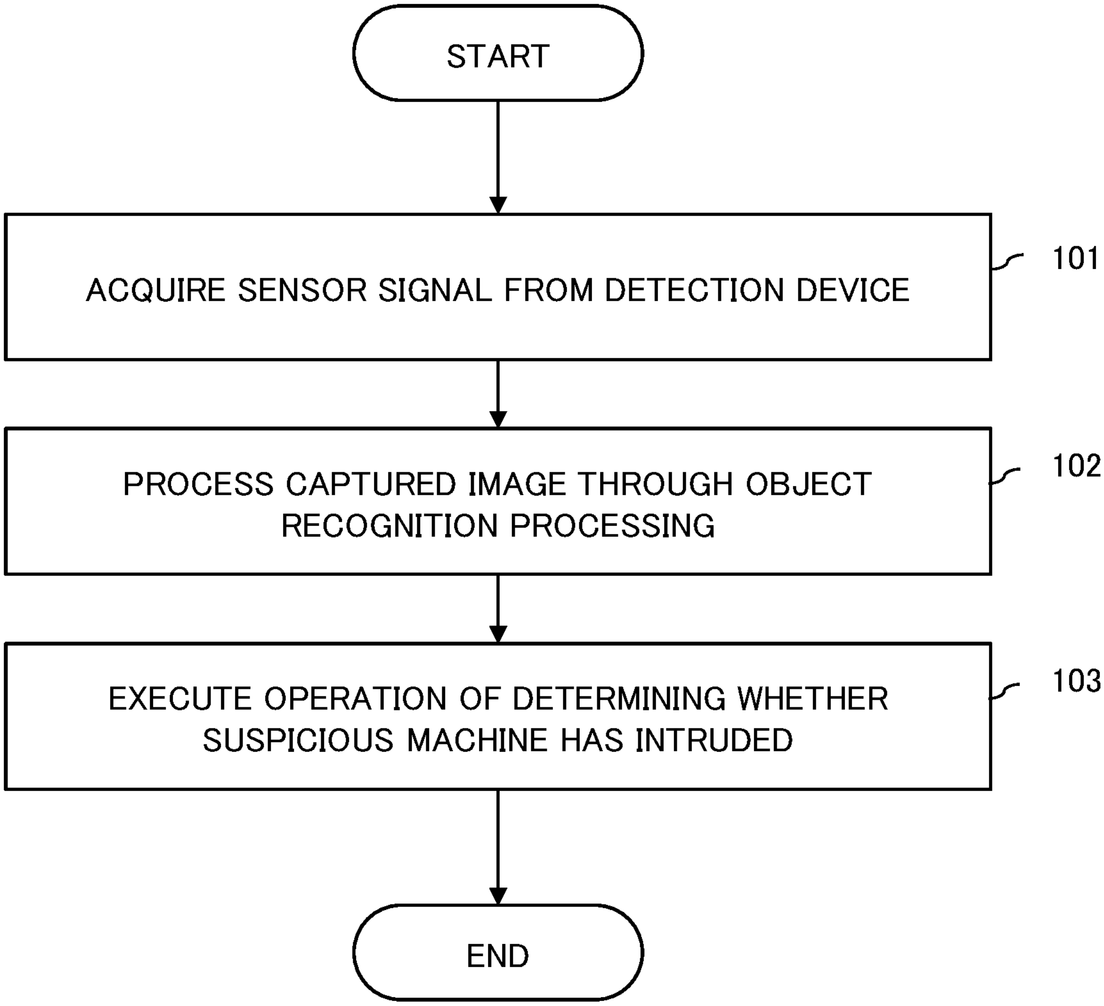
FIG. 5 is a flowchart illustrating an example of an operation of the intrusion determination device according to the first example embodiment.

The intrusion determination device 3 is configured as described above. Next, an example of an operation of the intrusion determination device 3 for determining an intrusion of a suspicious machine into a monitored airspace will be described with reference to FIG. 5. FIG. 5 is a flowchart illustrating an example of an operation of the intrusion determination device 3 for determining an intrusion of a suspicious machine into a monitored airspace.

For example, when the acquisition unit 31 of the intrusion determination device 3 acquires a sensor signal output from each of the plurality of types of detection sensors constituting the detection device 2 (step 101 in FIG. 5), the image processing unit 32 incorporates a captured image as a sensor signal from the camera. Then, the image processing unit 32 processes the captured image through object recognition processing to detect an unmanned aerial vehicle from the captured image when the unmanned aerial vehicle is shown in the captured image (step 102).

Thereafter, the determination unit 33 executes a determination operation of determining whether a suspicious machine has intruded into a monitored airspace based on information indicating a result of the object recognition processing on the captured image and the sensor signals output from the detection sensors other than the camera constituting the detection device 2 (step 103).

The intrusion determination device 3 and the intrusion detection system 1 including the intrusion determination device 3 according to the first example embodiment are configured as described above. In the first example embodiment, the detection device 2 that detects an unmanned aerial vehicle in the monitored airspace is constituted by a combination of a plurality of types of detection sensors including at least a camera. In addition, the intrusion determination device 3 has a configuration for determining an intrusion of a suspicious machine in the monitored airspace by combining sensor signals of the plurality of types of detection sensors output from the detection device 2. Since the detection device 2 is constituted by a combination of detection sensors that complements the disadvantages, the intrusion detection system 1 can reduce an occurrence of a detection failure or an erroneous detection of a suspicious machine, thereby improving reliability in detecting an intrusion of a suspicious machine into a monitored airspace.

In addition, the plurality of types of detection sensors constituting the detection device 2 includes at least a camera (image capturing device), and has a configuration for detecting an unmanned aerial vehicle through object recognition processing from an image captured by the camera. The use of the captured image makes it easy to acquire information on an appearance and a size of the unmanned aerial vehicle in the monitored airspace, and therefore, the intrusion determination device 3 and the intrusion detection system 1 can easily perform processing of determining an intrusion of a suspicious machine into a monitored airspace as compared with that in a case where a captured image is not used. Furthermore, since the captured image can be left as an image of the suspicious machine, the captured image can be evidence for proving that the suspicious machine has intruded into the monitored airspace.

Second Example Embodiment

Hereinafter, a second example embodiment of the present invention will be described. In the description of the second example embodiment, the same reference signs will be given to components having the same terms as those used in the description of the first example embodiment, and the redundant description of the common components will be omitted.

Figure 6:
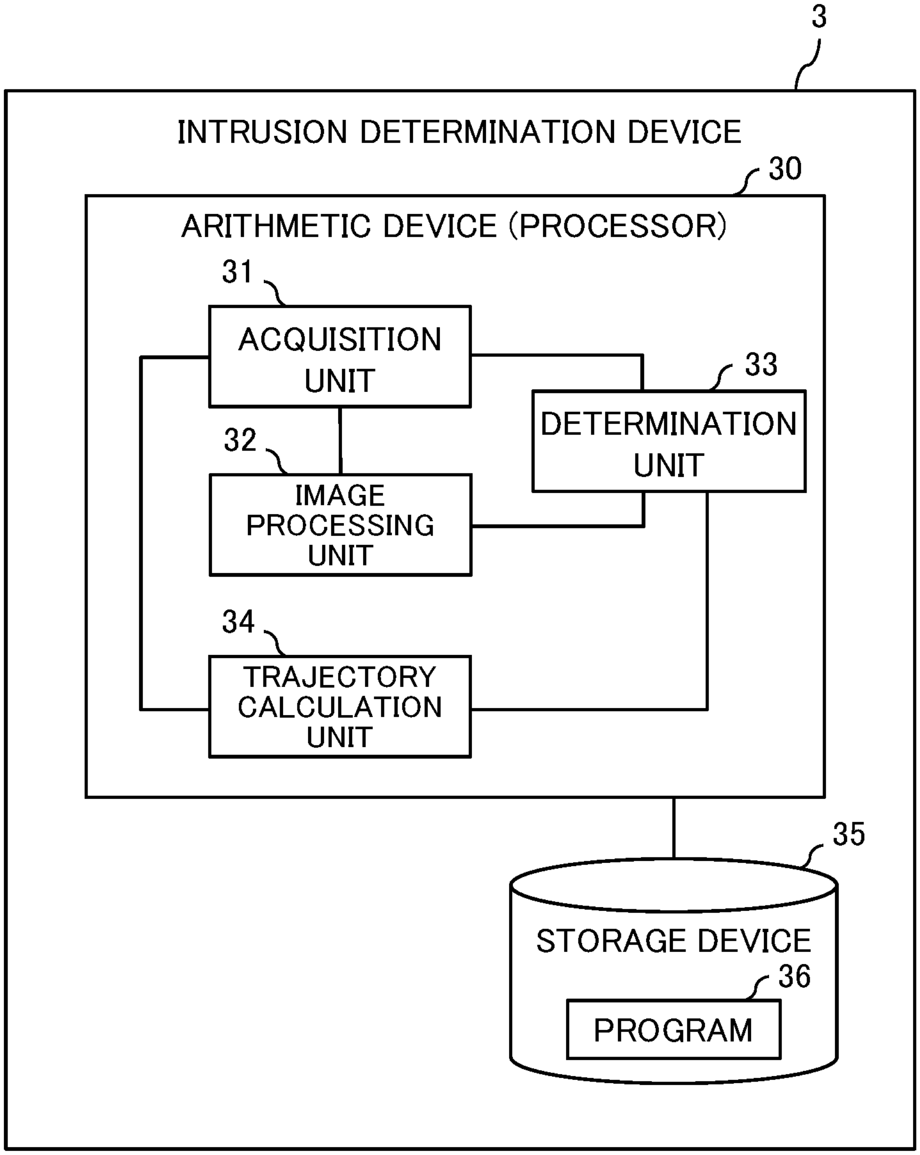
FIG. 6 is a block diagram illustrating a configuration of an intrusion determination device according to a second example embodiment.

FIG. 6 is a block diagram illustrating a configuration of the intrusion determination device 3 constituting the intrusion detection system 1 according to the second example embodiment. In the second example embodiment, the intrusion determination device 3 includes a trajectory calculation unit 34 in addition to the configuration according to the first example embodiment. The trajectory calculation unit 34 calculates a trajectory of an unmanned aerial vehicle in a monitored airspace based on sensor signals output from the detection device 2. For example, when an object is detected in the monitored airspace based on a sensor signal of the radar, the passive radar, the LiDAR, or the like output from the detection device 2, and the object is moving, the trajectory calculation unit 34 detects the moving object as an unmanned aerial vehicle. Further, the trajectory calculation unit 34 acquires a position of the detected unmanned aerial vehicle based on the sensor signals from the detection device 2, and calculates a trajectory of the unmanned aerial vehicle by connecting the positions of the unmanned aerial vehicle in time series. There are various methods for calculating a trajectory of an unmanned aerial vehicle using sensor signals of the detection device 2, and the method adopted here is not limited, and the description thereof will be omitted.

In the second example embodiment, the determination unit 33 of the intrusion determination device 3 determines an intrusion of a suspicious machine into the monitored airspace using the trajectory of the unmanned aerial vehicle calculated by the trajectory calculation unit 34 as well. For example, when the trajectory of the unmanned aerial vehicle detected in the monitored airspace is different from a flight route of a permitted machine acquired in advance, it is considered that the detected unmanned aerial vehicle is highly likely to be a suspicious machine. In addition, in a case where the trajectory of the unmanned aerial vehicle detected in the monitored airspace is a stray route, it is considered that the detected unmanned aerial vehicle is highly likely to be a suspicious machine. As described above, the trajectory of the unmanned aerial vehicle can be a criterion for determining whether the unmanned aerial vehicle is a suspicious machine. As a result, the determination unit 33 determines an intrusion of a suspicious machine into the monitored airspace using the trajectory of the unmanned aerial vehicle calculated by the trajectory calculation unit 34 in addition to the combination of the sensor signals of the plurality of types of detection sensors as described in the first example embodiment.

A configuration of the intrusion detection system 1 including the intrusion determination device 3 according to the second example embodiment other than the above-described configuration is similar to that in the first example embodiment.

The intrusion detection system 1 and the intrusion determination device 3 according to the second example embodiment detect an intrusion of a suspicious machine into a monitored airspace by using a trajectory of the unmanned aerial vehicle (a moving body regarded as the unmanned aerial vehicle) detected in the monitored airspace as well. Therefore, the intrusion detection system 1 and the intrusion determination device 3 according to the second example embodiment can further improve reliability in detecting an intrusion of a suspicious machine into a monitored airspace.

Third Example Embodiment

Hereinafter, a third example embodiment of the present invention will be described. In the description of the third example embodiment, the same reference signs will be given to components having the same terms as those used in the description of the first or second example embodiment, and the redundant description of the common components will be omitted.

Figure 7:
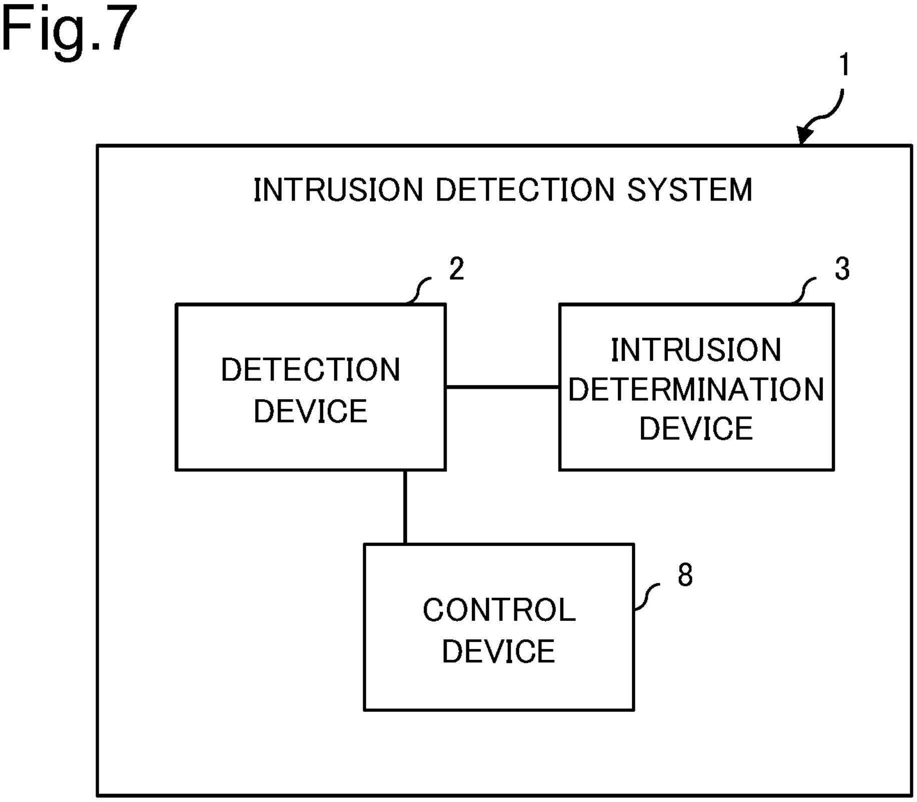
FIG. 7 is a block diagram illustrating a configuration of an intrusion detection system according to a third example embodiment.

FIG. 7 is a block diagram illustrating a configuration of an intrusion detection system according to the third example embodiment. The intrusion detection system 1 according to the third example embodiment includes a control device 8 in addition to the configuration of the intrusion detection system 1 according to the first or second example embodiment. In addition, in the third example embodiment, a camera that is an image capturing device constituting the detection device 2 is mounted on a drive device that changes an image capturing direction.

The control device 8 is a device that controls an image capturing direction of the camera constituting the detection device 2 by controlling the drive device on which the camera is mounted. That is, the control device 8 acquires a sensor signal of a detection sensor other than the camera, such as a radar, a LiDAR, or a passive radar, among the plurality of types of detection sensors constituting the detection device 2. Then, the control device 8 determines whether there is an object (hereinafter referred to as a warning object) considered as an unmanned aerial vehicle in the monitored airspace based on the acquired sensor signal. Furthermore, when a warning object is detected in the monitored airspace, the control device 8 extracts information on a position of the warning object included in the sensor signal of the radar, the LiDAR, the passive radar, or the like. Furthermore, the control device 8 controls an image capturing direction of the camera by controlling the drive device to capture an image of the warning object based on the extracted information on the position of the warning object.

As the camera constituting the detection device 2, a plurality of cameras may be used. In this case, the plurality of cameras is installed, for example, in such a way that an image capturing range of each of the plurality of cameras overlaps with some of an image capturing range of another camera, and the entire image of the monitored airspace can be captured by the plurality of cameras. In such a case, camera control data in which information for identifying the cameras and information on image capturing ranges of the cameras are associated with each other is given in advance to the control device 8. When a warning object is detected in the monitored airspace based on the sensor signal of the detection sensor other than the camera constituting the detection device 2, such as the radar, the LiDAR, or the passive radar, the control device 8 selects a target camera of which an image capturing range is to be controlled with reference to the camera control data. Then, the control device 8 controls an image capturing direction of the selected camera by controlling a drive device on which the selected camera is mounted in such a way that an image of the warning object can be captured.

A configuration other than the above-described configuration of the intrusion detection system 1 according to the third example embodiment is similar to that of the intrusion detection system 1 according to the first or second example embodiment.

When a warning object regarded as an unmanned aerial vehicle is detected in a monitored airspace based on a sensor signal of a detection sensor other than the camera, the intrusion detection system 1 according to the third example embodiment controls an image capturing direction of the camera in such a way that an image of the object can be captured. As a result, it is possible to expand an image capturing range in which one camera captures an image, and it is easy to obtain a captured image of a warning object in such a way that the captured image of the warning object is in a condition that makes object recognition processing convenient. As a result, the intrusion detection system 1 according to the third example embodiment can reduce an occurrence of a detection failure or an erroneous detection of a suspicious machine.

Other Example Embodiments

The present invention is not limited to the first to third example embodiments, and can be taken as various example embodiments. For example, in addition to the first to third example embodiments, the intrusion determination device 3 may be connected to a social networking service (SNS) information source, and the acquisition unit 31 may have a function of acquiring information posted on the SNS, that is, a comment or a photograph. In this case, for example, the determination unit 33 further has a function of analyzing the posted comment or the posted photograph on the SNS, which has been acquired from the SNS information source, and detecting whether there is an unmanned aerial vehicle flying in the monitored airspace and whether there is a suspicious machine among the unmanned aerial vehicles. As one method for analyzing a posted comment or a posted photograph, AI technology may be used. In a case where the AI technology is used, an analysis model is given to the intrusion determination device 3. The analysis model is a model generated by machine learning of a large number of posted comments and posted photographs related to unmanned aerial vehicles to output whether there is an unmanned aerial vehicle in a monitored airspace with a posted comment or a posted photograph being input to the analysis model and whether there is a suspicious machine when the unmanned aerial vehicle is detected. The determination unit 33 may determine whether a suspicious machine has intruded into the monitored airspace using a result of analyzing such information acquired from the SNS as well.

In addition, by visualizing a position at which the suspicious machine is flying through a heat map or the like using the result of analyzing the information acquired from the SNS, a behavior purpose of the suspicious machine can be estimated.

Figure 8:
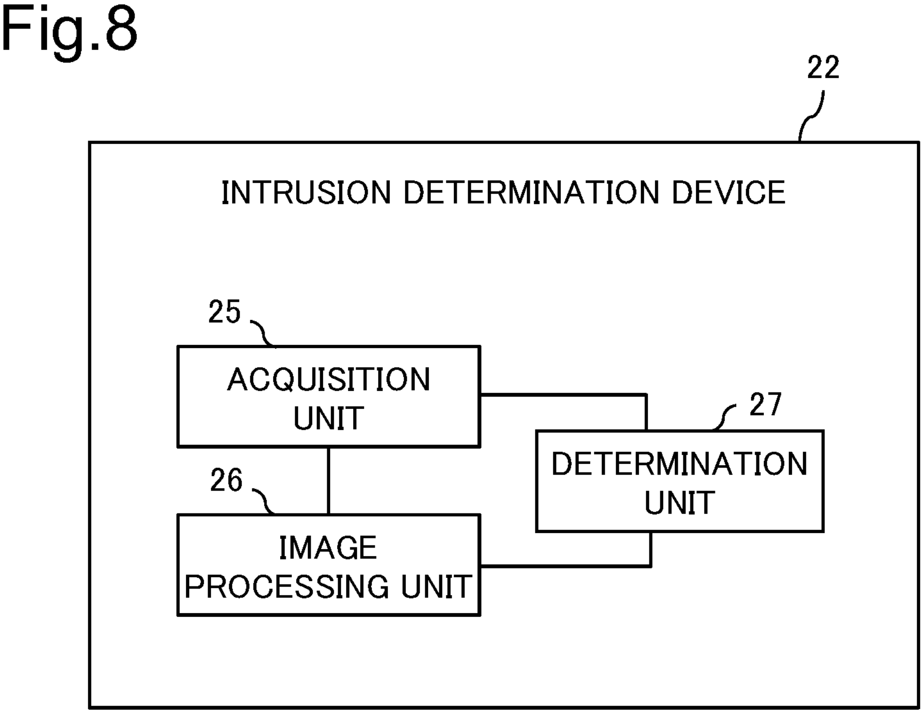
FIG. 8 is a block diagram illustrating a configuration of an intrusion determination device according to another example embodiment.
Figure 9:
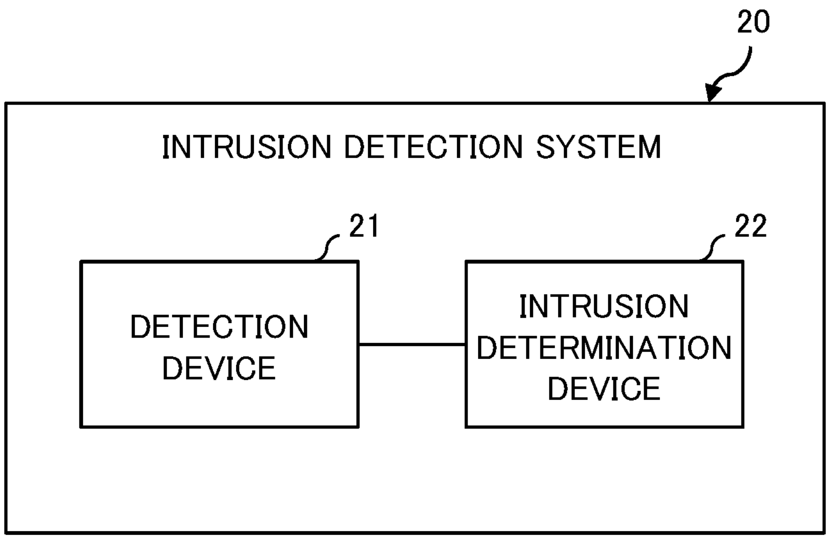
FIG. 9 is a block diagram illustrating a configuration of an intrusion detection system according to another example embodiment.

FIG. 8 illustrates an example of a configuration of an intrusion determination device according to another example embodiment. The intrusion determination device 22 is, for example, a computer device including an acquisition unit 25, an image processing unit 26, and a determination unit 27 as functional units. The intrusion determination device 22 is incorporated into an intrusion detection system 20 shown in FIG. 9. The intrusion detection system 20 includes a detection device 21 and an intrusion determination device 22. The intrusion determination device 22 is connected to the detection device 21. The detection device 21 is constituted by a combination of a plurality of types of detection sensors including at least an image capturing device among a plurality of types of detection sensors including a radar, a LiDAR, a passive radar, and the image capturing device. The radar detects an unmanned aerial vehicle using a radio wave, and the LiDAR detects an unmanned aerial vehicle using a laser beam. The passive radar detects an unmanned aerial vehicle by detecting a radio wave used by the unmanned aerial vehicle for communication, and the image capturing device functions as a sensor that detects an unmanned aerial vehicle.

The acquisition unit 25 of the intrusion determination device 22 acquires sensor signals output from the detection device 21.

The image processing unit 26 detects an unmanned aerial vehicle through object recognition processing from a captured image as a sensor signal output from the image capturing device. The determination unit 27 determines whether a suspicious machine, which is an unmanned aerial vehicle not permitted to fly in a monitored airspace, has intruded into the monitored airspace based on a sensor signal output from a detection sensor other than the image capturing device, among the plurality of types of detection sensors constituting the detection device 21, and a result of detecting an unmanned aerial vehicle from a captured image.

Figure 10:
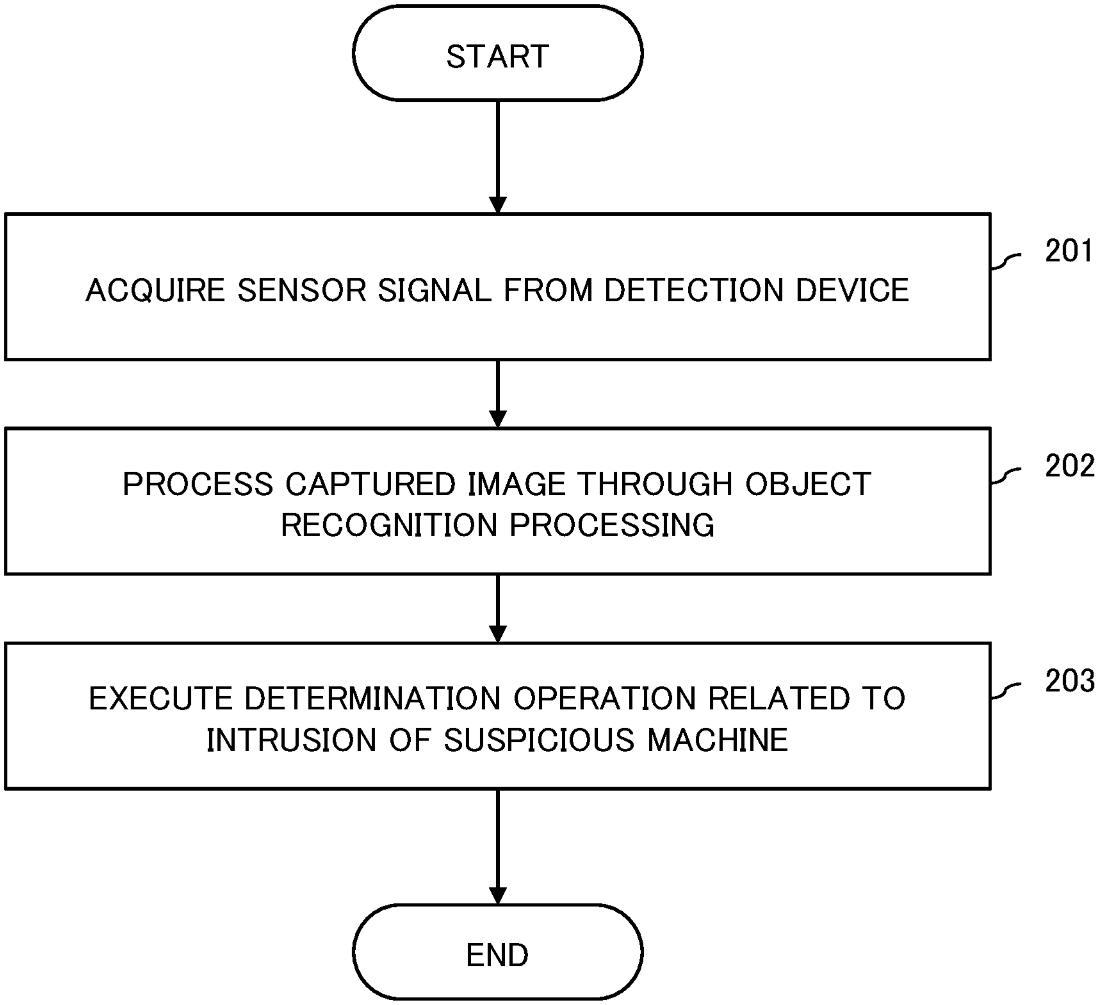
FIG. 10 is a flowchart illustrating an example of an operation of the intrusion determination device according to another example embodiment.

Hereinafter, an example of an operation of the intrusion determination device 22 will be described with reference to FIG. 10. FIG. is a flowchart illustrating an example of an operation of the intrusion determination device 22.

For example, when the acquisition unit 25 of the intrusion determination device 22 acquires a sensor signal output from each of the plurality of types of detection sensors constituting the detection device 21 (step 201 in FIG. 10), the image processing unit 26 incorporates an image captured by the image capturing device. Then, the image processing unit 26 processes the captured image through object recognition processing to detect an unmanned aerial vehicle from the captured image when the unmanned aerial vehicle is shown in the captured image (step 202).

Thereafter, the determination unit 27 executes a determination operation of determining whether a suspicious machine has intruded into a monitored airspace based on information indicating a result of the object recognition processing on the captured image and the sensor signals output from the detection sensors other than the image capturing device constituting the detection device 21 (step 203).

The intrusion detection system 20 and the intrusion determination device 22 according to another example embodiment can complement disadvantages of detection sensors using a combination of a plurality of types of detection sensors. As a result, the intrusion detection system 20 and the intrusion determination device 22 can reduce an occurrence of a detection failure or an erroneous detection of a suspicious machine.

The present invention has been described above using the above-described example embodiments as exemplary embodiments. However, the present invention is not limited to the above-described example embodiments. That is, various aspects of the present invention that can be understood by those of ordinary skill in the art may be applied within the scope of the present invention.

This application is based upon and claims the benefit of priority from Japanese patent application No. 2021-116109, filed on Jul. 14, 2021, the disclosure of which is incorporated herein in its entirety by reference.

REFERENCE SIGNS LIST

1, 20 Intrusion detection system
2, 21 Detection device
3, 22 Intrusion determination device
8 Control device
25, 31 Acquisition unit
26, 32 Image processing unit
27, 33 Determination unit
34 Trajectory calculation unit
38 Notification unit

What is claimed is:

1. An intrusion determination device comprising:

one or more memories storing instructions; and one or more processors configured to execute the instructions to:

acquire sensor signals output from a detection device constituted by a combination of a plurality of types of detection sensors including at least an image capturing device and a passive radar, the passive radar being a sensor that detects an unmanned aerial vehicle in a monitored airspace by detecting a radio wave used by the unmanned aerial vehicle for communication;

detect an unmanned aerial vehicle through object recognition processing from a captured image as a sensor signal output from the image capturing device; and determine whether a suspicious machine, which is an unmanned aerial vehicle not permitted to fly in the monitored airspace, has intruded into the monitored airspace, based on a sensor signal output from the passive radar and a result of detecting an unmanned aerial vehicle in the captured image, wherein the one or more processors are configured to determine that the unmanned aerial vehicle is the suspicious machine in a case where the unmanned aerial vehicle is detected by the object recognition processing from the captured image, even when the radio wave is not detected by the passive radar due to a state of autonomous flight of the unmanned aerial vehicle or obstruction by a building or other structure, wherein the one or more processors are further configured to execute the instructions to:

acquire information posted on a social networking service (SNS); and determine the suspicious machine has intruded into the monitored airspace based on the information posted on the SNS.

2. The intrusion determination device according to claim 1, wherein the one or more processors are configured to execute the instructions to detect the unmanned aerial vehicle from the captured image using a detection model that outputs information regarding whether the unmanned aerial vehicle is present or absent in the captured image with the captured image being input to the detection model as the object recognition processing.

3. The intrusion determination device according to claim 1, wherein the one or more processors are further configured to execute the instructions to calculate a trajectory of the unmanned aerial vehicle in the monitored airspace based on the sensor signals output from the detection device; and detect that the suspicious machine has intruded into the monitored airspace using the trajectory of the unmanned aerial vehicle as well.

4. The intrusion determination device according to claim 1, wherein the one or more processors are further configured to execute the instructions to output information for notifying an intrusion of the suspicious machine into the monitored airspace when it is determined that the suspicious machine has intruded into the monitored airspace.

5. The intrusion determination device according to claim 1, wherein the one or more processors are configured to determine the suspicious machine has intruded into the monitored airspace in a case where a trajectory of the suspicious machine is different from a flight route of a permitted machine permitted to fly in the monitored airspace and in a case where the trajectory of the suspicious machine is a stray route.

6. An intrusion determination method performed by a computer, the intrusion determination method comprising:

acquiring sensor signals output from a detection device constituted by a combination of a plurality of types of detection sensors including at least an image capturing device and a passive radar, the passive radar being a sensor that detects an unmanned aerial vehicle in a monitored airspace by detecting a radio wave used by the unmanned aerial vehicle for communication;

detecting an unmanned aerial vehicle through object recognition processing from a captured image as a sensor signal output from the image capturing device; and determining whether a suspicious machine, which is an unmanned aerial vehicle not permitted to fly in the monitored airspace, has intruded into the monitored airspace, based on a sensor signal output from the passive radar and a result of detecting an unmanned aerial vehicle in the captured image, wherein the determining comprises determining that the unmanned aerial vehicle is the suspicious machine in a case where the unmanned aerial vehicle is detected by the object recognition processing from the captured image, even when the radio wave is not detected by the passive radar due to a state of autonomous flight of the unmanned aerial vehicle or obstruction by a building or other structure, wherein the intrusion determination method further comprises:

acquiring information posted on a social networking service (SNS); and determining the suspicious machine has intruded into the monitored airspace based on the information posted on the SNS.

7. The intrusion determination method according to claim 6, further comprising:

by a computer, detecting the unmanned aerial vehicle from the captured image using a detection model that outputs information regarding whether the unmanned aerial vehicle is present or absent in the captured image with the captured image being input to the detection model as the object recognition processing.

8. The intrusion determination method according to claim 6, further comprising:

by a computer, calculating a trajectory of the unmanned aerial vehicle in the monitored airspace based on the sensor signals output from the detection device; and detecting that the suspicious machine has intruded into the monitored airspace using the trajectory of the unmanned aerial vehicle as well.

9. The intrusion determination method according to claim 6, further comprising:

by a computer, outputting information for notifying an intrusion of the suspicious machine into the monitored airspace when it is determined that the suspicious machine has intruded into the monitored airspace.

10. A non-transitory computer readable medium storing a computer program causing a computer to execute:

acquiring sensor signals output from a detection device constituted by a combination of a plurality of types of detection sensors including at least an image capturing device and a passive radar, the passive radar being a sensor that detects an unmanned aerial vehicle in a monitored airspace by detecting a radio wave used by the unmanned aerial vehicle for communication;

detecting an unmanned aerial vehicle through object recognition processing from a captured image as a sensor signal output from the image capturing device; and determining whether a suspicious machine, which is an unmanned aerial vehicle not permitted to fly in the monitored airspace, has intruded into the monitored airspace, based on a sensor signal output from the passive radar and a result of detecting an unmanned aerial vehicle in the captured image, wherein the determining comprises determining that the unmanned aerial vehicle is the suspicious machine in a case where the unmanned aerial vehicle is detected by the object recognition processing from the captured image, even when the radio wave is not detected by the passive radar due to a state of autonomous flight of the unmanned aerial vehicle or obstruction by a building or other structure, wherein the computer program further causes the computer to execute:

acquiring information posted on a social networking service (SNS); and determining the suspicious machine has intruded into the monitored airspace based on the information posted on the SNS.

11. The non-transitory computer readable medium according to claim 10, wherein the computer program cause further a computer to execute:

detecting the unmanned aerial vehicle from the captured image using a detection model that outputs information regarding whether the unmanned aerial vehicle is present or absent in the captured image with the captured image being input to the detection model as the object recognition processing.

12. The non-transitory computer readable medium according to claim 10, wherein the computer program cause further a computer to execute:

calculating a trajectory of the unmanned aerial vehicle in the monitored airspace based on the sensor signals output from the detection device; and detecting that the suspicious machine has intruded into the monitored airspace using the trajectory of the unmanned aerial vehicle as well.

13. The non-transitory computer readable medium according to claim 10, wherein the computer program cause further a computer to execute:

outputting information for notifying an intrusion of the suspicious machine into the monitored airspace when it is determined that the suspicious machine has intruded into the monitored airspace.

* * * * *